Fig. 1
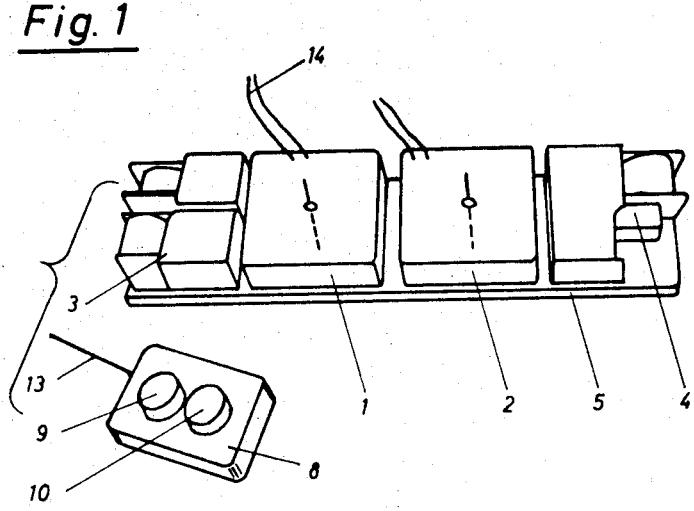
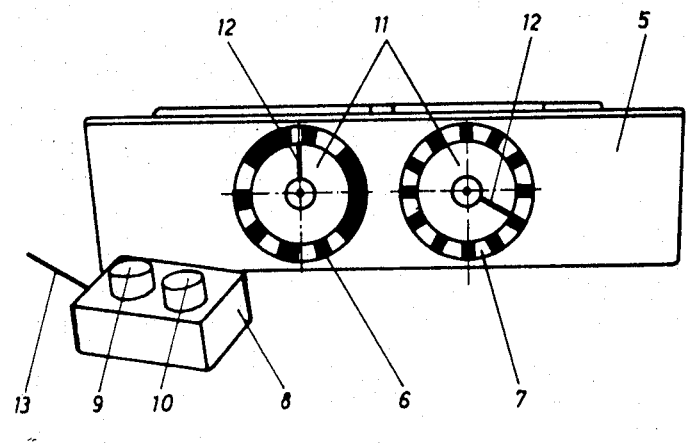
Fig. 2

United States Patent Office 3,439,141
Patented Apr. 15, 1969

3,439,141
CONTROL UNIT FOR WASHING MACHINES
Walter Holzer, Drosteweg 19, Meersburg (Bodensee), Germany
Filed Apr. 19, 1967, Ser. No. 634,033
Claims priority, application Germany, Apr. 19, 1966, H 59,156
Int. Cl. H01h 9/02, 7/08; H02b 1/08
U.S. Cl. 200—168                                   4 Claims

ABSTRACT OF THE DISCLOSURE

A control unit for a washing machine in which the programme and/or selector switch can be remotely controlled by a separate switching circuit.

The present invention relates to a control unit, primarily included for the control of washing machines, having a programme switch and a motor selector switch.

An object of the invention is to provide an improved control unit with which a good watertight seal can be provided when it is fitted to a washing machine for the control thereof.

With programme-controlled machines such as, for example, automatic washing machines, rotary switches, push-button switches, switch plates and other such fittings are generally used for programme selection. Users prefer push-button switching, because it is simpler to operate. It has been found that any assembly of more than eight push-buttons is, generally speaking, too much to supervise. On the other hand, a large number of programmes or switching operations is often required in practice— for example, 16 or more programmes, in the case of washing machines. A push-button assembly with one button for each switching operation is therefore out of the question here. Makers have therefore been compelled hitherto to resort to other kinds of switches, of less appeal to users.

A further object of the invention is to provide a control unit which overcomes these difficulties and provides a simple push-button operation, even when the programmes or switching operations are numerous.

According to the present invention there is provided a control unit, primarily intended for the control of washing machines, having a programme switch and a motor-driven selector switch, wherein the programme switch and the selector switch are mounted in watertight fashion, along with their actuating equipment behind a faceplate and can be remotely controlled with a push-button switch.

To serve such a control unit, four push-buttons at most are required, with which the programme switch can be set moving or can be controlled while the programme is under way and the selector switch can be operated, all by remote control. Thus, the actual programme selection is made by a motor-driven selector switch, so that 16 or even a far greater number of programmes can be selected. One great advantage is that the programme and selector switches are placed within a watertight unit, so that no problems of insulation or moisture arise. Such a control unit can therefore be fitted in any chosen position in the machine, even where it will be exposed to splashing with water and to the action of detergents. The machine can always be controlled from the push-button switch mounted in front, without any need to fumble about the machine.

The push-button switch may have one button for starting the programme switch or for operating it while the programme is under way and another button for operating the selector switch.

Thus, when one button is pushed, the motor-driven selector switch is started up, so that the desired programme can be selected. If one wishes to change this (by switching over to fast running, for example), the other button is used. Operation in this way is extremely simple and is easy to supervise. The non-expert in particular prefers this way of operating programme controls.

Advantageously, the push-button switch has one button with which the number or duration of switching impulses can be regulated, so that either the programme switch or the selector switch can be operated at will by means of this button.

In this form of construction, the number of components and controls is reduced to the absolute minimum. The desired control action is here achieved by depressing the single button for a longer or a shorter period of time. The number or length of switching impulses allotted to the control stages can be adapted in whatever way is best suited to the requirements of the case.

Preferably, the faceplate is provided with a programme indicator scale and a selection indicator scale, as well as transparent windows, behind which indicators associated with the programme switch or selector switch are fitted.

By this means, the entire system, including the indicators can be mounted behind the switch panel and kept completely watertight, there being no need to carry any spindles through the panel, in the way which, in appliances used hitherto, gives rise to sealing difficulties.

One embodiment of the invention is described hereunder by way of example in conjunction with the accompanying drawings, in which:

FIGURE 1 is a rear view of a control unit conforming to the invention, with its push-button switch shown separately, and FIGURE 2 is a front view of the unit shown in FIGURE 1.

As can be seen from the drawings, a programme switch, 1, and a selector switch, 2, are mounted behind a common faceplate, 5, along with their actuating equipment, 3 and 4. Switches 1 and 2 in themselves may be of any conventional type but it is preferable to use the very shallow type illustrated in FIGURE 1. Programme switch 1 and selector switch 2 are electrically connected to their equipment 3 and 4 in the usual way, by means of printed circuit plates, for example, and/or by wiring. A connection lead, 14, runs to the interior of the machine that is to be controlled.

For operating the control device, a separate push-button switch, 8, is provided this being connected by cable 13 to the unit mounted behind faceplate 5. Push-button switch 8 has two buttons 9 and 10. In the example illustrated, the arrangement is such that with button 9 the programme switch 1 can be started or can be operated while the programme is under way, while button 10 serves to operate selector switch 2.

Buttons 9 and 10 control the respective actuating mechanisms 3 and 4 for switches 1 and 2. Mechanisms 3 and 4 can be, for example, motors whose output shafts are respectively connected by suitable gears to an accessible portion, such as rearwardly extending shafts, or internal shafts of switches 1 and 2. Depression of a button 9 or 10 energizes a respective motor to turn the shaft of the connected switch 1 or 2 and its respective indicator 12. The motors can be of the type which run continuously while a respective button is depressed, or one of which takes one step each time the button is depressed. Alternating mechanisms 3 and 4 can be stepping switches to drive switches 1 and 2 and their indicators. Also, the drive mechanism can be located within the covers of switches 1 and 2 and electrical connections made between the devices 3 and 4, or directly from push button controls 9 and 10 to the switches.

The ease with which the control unit here proposed can be kept under supervision is made clear by FIGURE 2. It will be observed that faceplate 5 carries a programme indicator scale 6, and a selection indicator scale 7. Transparent windows 11 are provided in these scales, behind which can be seen the indicators 12, associated with programme switch 1 and selector switch 2. Faceplate 5 presents an unbroken surface, not pierced by any spindles or the like.

To use the control unit, in the example illustrated, all that is required is to press button 10 of push-button switch 8. This causes motor-driven selector switch 2 to start, its position at any moment being shown by the indicator behind selection indicator scale 7. The progress of the programme and its position at any given moment can be seen from programme indicator scale 6. Depression of button 9 starts the programme or changes it while it is under way, by operating programme switch 1 to switch over to fast running, for example.

The control unit can also be remotely controlled with the aid of a push-button switch provided with only a single button, by which the number or duration of switching impulses is controlled. In this case, either the programme switch or the selector switch can be operated at will, by keeping this button depressed for a longer or a shorted period of time.

As shown in FIG. 1, the switches 1 and 2 have their front faces sealed by the faceplate 5 and their rear portion by the respective covers. The drive members, if used, from actuators 3 and 4 are also preferably sealed where they enter the housings of switches 1 and 2.

Although a push-button switch has been used in the foregoing description of the invention, it is naturally also possible in principle to employ any other simple kind of switch for the remote control of the unit. What is important is that simple on-off switches are sufficient, all that is required of them being convenience of use and ease of supervision.

What I claim is:

1. A control unit for a washing machine having a faceplate, programming switch means and selector switch means, means mounting said programming switch means and said selector switch means to the backside of said faceplate in a water-tight housing so that water and other material from the front of the machine will not contact the electrical components of the two switch means, an electric motor driving each of said programming and selector switch means, and further switch means located remote from said washing machine controlling the operation of each of said electric motors to thereby control the driving of said programming and selector switch means.

2. A control unit as in claim 1 wherein said further switch means includes a separate switch for each of said electric motors.

3. A control unit as in claim 1 wherein said further switching means and said electric motors operate to advance a respective one of said programming and selector switches one step each time said further switching means is operated.

4. A control unit as in claim 1 further comprising a transparent window mounted in said faceplate for each of said programming and selector switch means; a respective indicator scale for each of said programming and selector switch means, and a respective indicator for each of said programming and selector switch means.

References Cited

UNITED STATES PATENTS

| | | | |
|---|---|---|---|
| 3,132,216 | 5/1964 | Adams | 200—167 XR |
| 3,140,595 | 7/1964 | Low | 68—12 |
| 3,171,006 | 2/1965 | Mulch et al. | |
| 3,246,182 | 4/1966 | Hanchett. | |

ROBERT K. SCHAEFER, *Primary Examiner.*

H. O. JONES, *Assistant Examiner.*

U.S. Cl. X.R.

200—38